US006308119B1

(12) United States Patent
Majkowski et al.

(10) Patent No.: US 6,308,119 B1
(45) Date of Patent: Oct. 23, 2001

(54) PRESET DIAGNOSTIC LEAK DETECTION METHOD FOR AN AUTOMOTIVE EVAPORATIVE EMISSION SYSTEM

(75) Inventors: Stephen F. Majkowski, Rochester Hills; Michael J. Steckler, Highland; Kenneth M. Simpson, Howell, all of MI (US); Malcolm James Grieve, Fairport, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/438,068

(22) Filed: Nov. 10, 1999

(51) Int. Cl.[7] ...................................................... G01M 3/26

(52) U.S. Cl. ........................... 701/29; 701/31; 73/40.5 R; 73/49.2; 73/49.7; 123/520

(58) Field of Search ................................. 701/29, 31, 36, 701/60, 103, 112, 114; 73/40.5, 49.2, 49.7; 123/520, 516, 518

(56) References Cited

U.S. PATENT DOCUMENTS 5,542,397 * 8/1996 Takahata et al. .................... 123/520

* cited by examiner

*Primary Examiner*—William A. Cuchlinski, Jr.
*Assistant Examiner*—Arthur D. Donnelly
(74) *Attorney, Agent, or Firm*—Vincent A. Cichosz

(57) ABSTRACT

An improved method of diagnosing evaporative emission system leaks at engine idle, wherein the system is closed and drawn down to a sub-atmospheric pressure early in a driving cycle prior to the achievement of an idle condition appropriate for leak testing. When the test enabling conditions other than engine idle are met, the system vent is closed, and the purge valve is modulated to regulate the fuel tank pressure at a sub-atmospheric value substantially equivalent to the leak test pressure to be used at engine idle. When engine idle is achieved, the purge valve is closed, and the leak test is conducted with little or no delay. The time required to conduct the leak test is improved because the system pressure is at or near the test pressure when the engine idle condition is achieved, and at the same time, the reliability of the leak test data is improved because vapor generation equilibrium in the fuel tank is more nearly achieved when the leak test is initiated.

10 Claims, 4 Drawing Sheets

PRESET DIAGNOSTIC LEAK DETECTION METHOD FOR AN AUTOMOTIVE EVAPORATIVE EMISSION SYSTEM

TECHNICAL FIELD

The present invention relates to the diagnosis of an automotive evaporative emission system, and more particularly to a method for diagnosing the existence of air leaks in the system.

BACKGROUND OF THE INVENTION

In automotive evaporative emission systems, fuel vapor generated in the vehicle fuel tank is captured in a charcoal-filled canister and subsequently supplied to the engine air intake through a solenoid purge valve. Since the effectiveness of the system can be significantly impaired by faulty operation of a component or by a leak in one or more of the hoses or components, the engine controller is generally programmed to carry out a number of diagnostic algorithms for detecting such failures. If faulty operation is detected, the result is stored and a "check engine" lamp is activated to alert the driver so that corrective action can be taken.

Experience has shown that small leaks in the evaporative system can be particularly difficult to reliably detect and diagnose due to variability of fuel characteristics, driving schedules, and environmental conditions. While small leaks can theoretically be detected at engine idle by closing off the air vent, drawing the system below atmospheric pressure with engine vacuum, and then monitoring the change in system pressure, it is difficult to obtain reliable test data in a short period of time because of the time required to evacuate and establish vapor generation equilibrium in the system. Accordingly, what is needed is a method of quickly and reliably diagnosing evaporative emission system leaks at engine idle.

SUMMARY OF THE INVENTION

The present invention is directed to an improved method of diagnosing evaporative emission system leaks at engine idle, wherein the system is closed and drawn down to a sub-atmospheric pressure early in a driving cycle prior to the achievement of an idle condition appropriate for leak testing. When the test enabling conditions other than engine idle are met, the system vent is closed, and the purge valve is modulated to regulate the fuel tank pressure at a sub-atmospheric value at or near the leak test pressure to be used at engine idle. When engine idle is achieved, the purge valve is closed, and the leak test is conducted with little or no delay. The time required to conduct the leak test is improved because the system pressure is at or near the test pressure when the engine idle condition is achieved, and at the same time, the reliability of the leak test data is improved because vapor generation equilibrium in the fuel tank is more nearly achieved when the leak test is initiated.

Additionally, the existence of a large leak can be diagnosed even if engine idle operation is not achieved within an allowable period, if the purge valve is unable to draw the system pressure down to the preset target within a predefined interval.

DESCRIPTION OF THE PREFERRED EMBODIMENT

Figure 1:
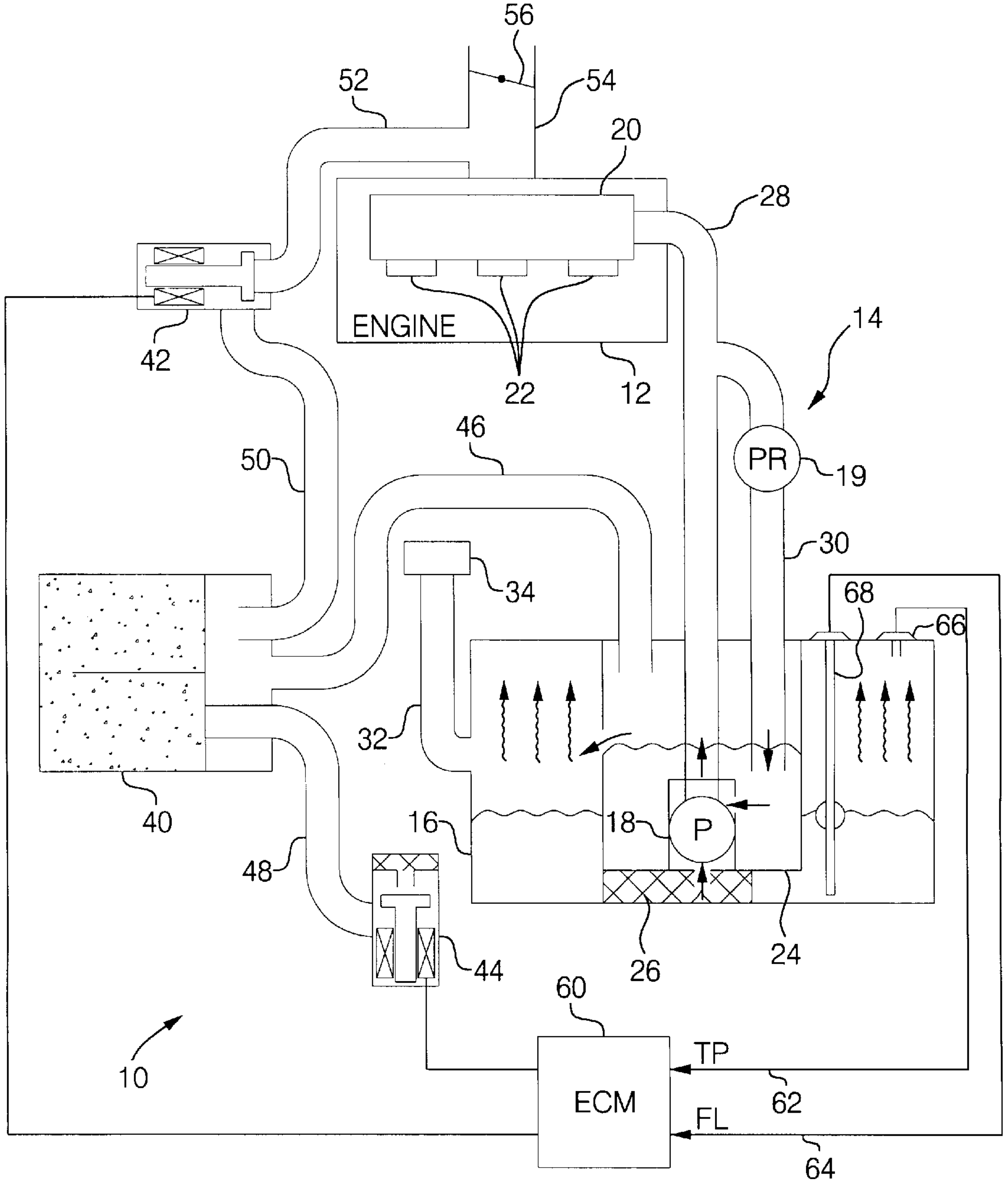
FIG. 1 is a diagram of an automotive evaporative emission system according to this invention, including a microprocessor-based engine control module (ECM).
Figure 2A:
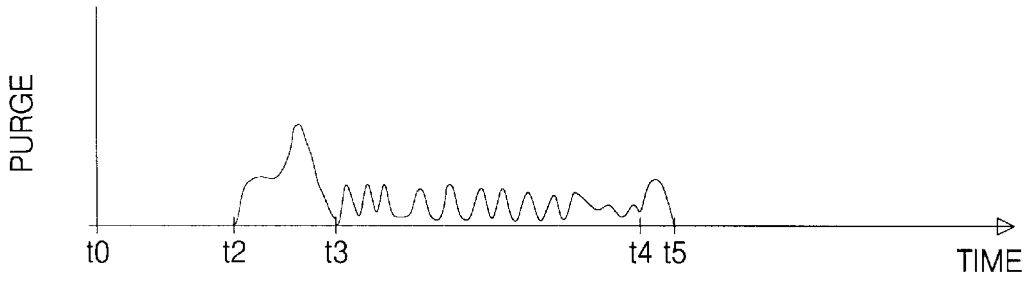
FIG. 2, Graphs A–D, graphically depict the operation of the diagnostic method of this invention.
Figure 2B:
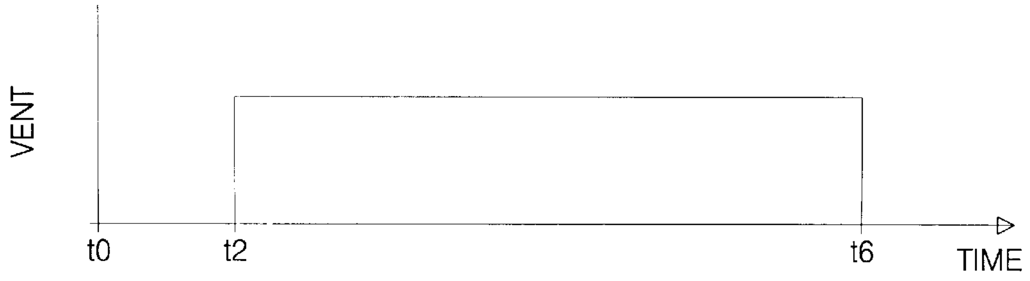
Figure 2C:
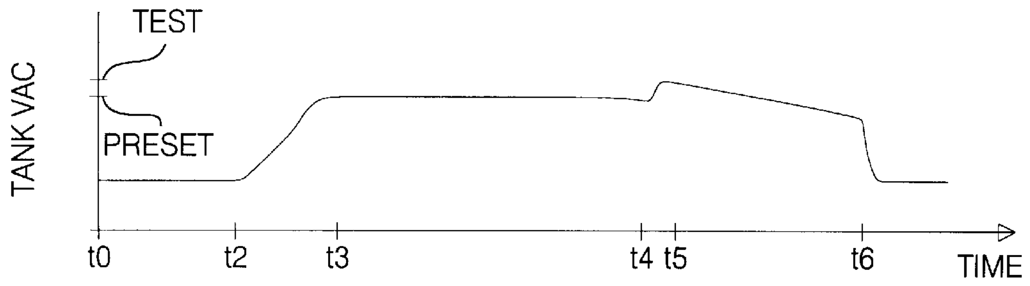
Figure 2D:
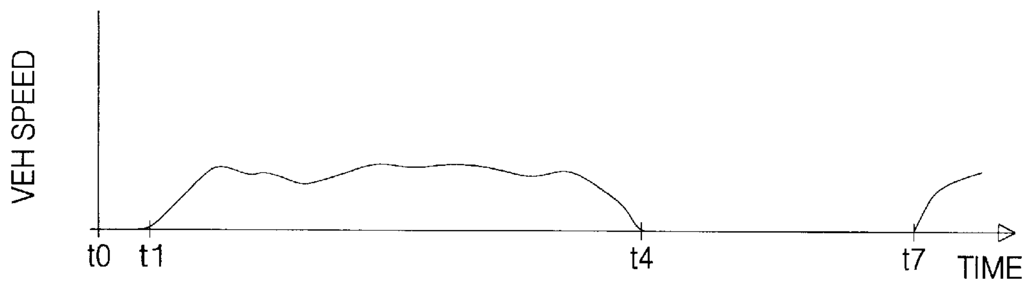

Referring to FIG. 1, the reference numeral 10 generally designates an evaporative emission system for an automotive engine 12 and fuel system 14. The fuel system 14 includes a fuel tank 16, a fuel pump (P) 18, a pressure regulator (PR) 19, an engine fuel rail 20, and one or more fuel injectors 22. The fuel tank 16 has an internal chamber 24, and the pump 18 draws fuel into the chamber 24 through a filter 26, as generally indicated by the arrows. The fuel line 28 couples the pump 18 to the fuel rail 20, and the pressure regulator 19 returns excess fuel to chamber 24 via fuel line 30. Fuel is supplied to the tank 16 via a conventional filler pipe 32 sealed by the removable fill cap 34.

The evaporative emission system 10 includes a charcoal canister 40, a solenoid purge valve 42 and a solenoid air vent valve 44. The canister 40 is coupled to fuel tank 16 via line 46, to air vent valve 44 via line 48, and to purge value 42 via line 50. The air vent valve 44 is normally open so that the canister 40 collects hydrocarbon vapor generated by the fuel in tank 16, and in subsequent engine operation, the normally closed purge valve 42 is modulated to draw the vapor out of canister 40 via lines 50 and 52 for ingestion in engine 12. To this end, the line 52 couples the purge valve 42 to the engine intake manifold 54 on the vacuum or downstream side of throttle 56.

The air vent valve 44 and purge valve 42 are both controlled by a microprocessor-based engine control module (ECM) 60, based on a number of input signals, including the fuel tank pressure (TP) on line 62 and the fuel level (FL) on line 64. The fuel tank pressure is detected with a conventional pressure sensor 66, and the fuel level is detected with a conventional fuel level sender 68. Of course, the ECM 60 controls a host of engine related functions, such as fuel injector opening and closing, ignition timing, and so on.

In general, the ECM 60 diagnoses leaks in the evaporative emission system 10 by suitably activating the solenoid valves 42 and 44,and monitoring the fuel tank pressure TP. According to the invention, the diagnostic method involves a pre-draw or preset step that is carried out early in a driving cycle when the leak test enabling conditions other than engine idle have been met. When an engine idle condition is achieved, the system pressure is typically at or near the test pressure, with the vapor pressure equilibrium already stabilized, and the leak test is carried out with little or no delay. The preset step is carried out by setting the vent valve 44 to its closed state, and modulating the purge valve 42 to regulate the fuel tank pressure TP at a desired sub-atmospheric value which is at or near the leak test pressure to be used at engine idle. When engine idle is achieved, the purge valve 42 is set to its closed state to establish a closed system and the leak test is initiated, provided that the preset mode has been in effect for at least a predetermined minimum time interval. The time required to conduct the leak test is improved because the system pressure is at or near the test pressure when the engine idle condition is achieved, and at the same time, the reliability of the leak test data is improved because vapor generation equilibrium in the fuel tank is more nearly achieved when the leak test is initiated.

The above-described method is graphically depicted in FIG. 2, where Graph A depicts the state of the purge valve 42, Graph B depicts the state of the vent valve 44, Graph C depicts a tank vacuum signal developed from the TP signal, and Graph D depicts the vehicle ground speed, all as a common function of driving cycle time. By convention, the vacuum signal of Graph C depicts increasing vacuum as a positive quantity, and increasing pressure as a negative quantity.

As seen in Graph D, the driving cycle is initiated with engine starting at time t0, and after a short idle interval t0–t1, the vehicle begins moving, and then returns to idle during the interval t4–t7. At time t2, the leak test enabling conditions other than engine idle have been met; these may include: engine coolant temperature in a predefined range, the difference between the coolant temperature and the inlet air temperature in a given range, measured fuel level in a given range, and barometric pressure in a given range. At such point, the preset step is initiated by activating the normally open air vent valve 44 to its closed state, and modulating the purge valve 42 in closed-loop fashion to regulate the tank vacuum at a desired value, designated as Preset in Graph C. Initially, the duty cycle of modulation is relatively high, as seen in Graph A, and is then reduced to a lower level after time t3 when the tank vacuum reaches the Preset value. When the engine idle condition is reached at time t4, the leak test is initiated, provided that the preset mode has been in effect for at least a predefined minimum time interval. In the illustrated embodiment, the leak test is initiated by increasing the modulation of the purge valve 42 to bring the tank vacuum to a slightly higher value, designated in Graph C as Test. This initial system pressure for the leak test is reached shortly thereafter at time t5, and the purge value 42 is deactivated to establish a closed system. In the interval t5–t6, the change in tank pressure (due to a system leak, for example) is monitored and recorded as a slope (i.e., change in pressure/time, also referred to herein as LEAK TEST SLOPE). At time t6, and the vent valve 44 is re-opened, allowing the system pressure to return to its normal level, and concluding the diagnostic routine.

Figure 3:
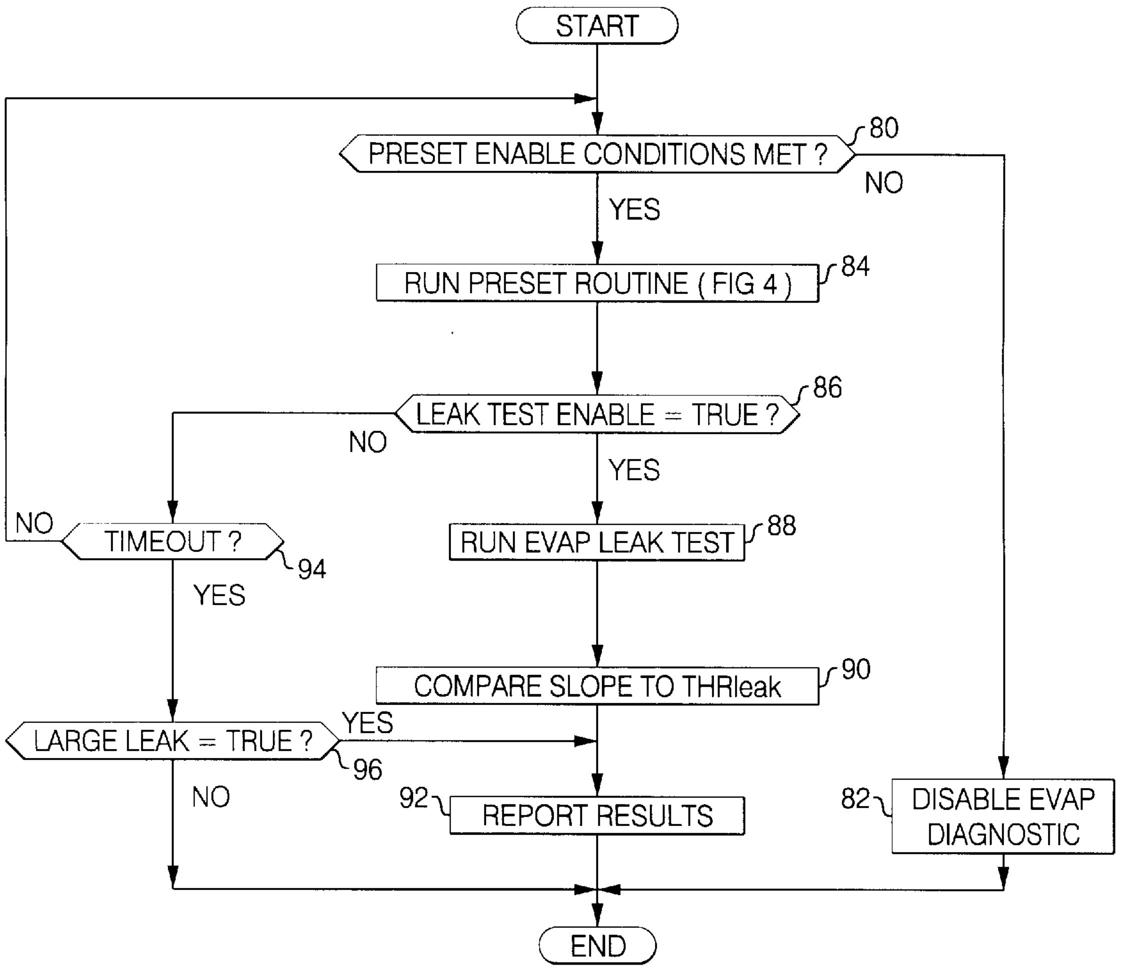
FIGS. 3 and 4 are flow diagrams representative of computer program instructions executed by the ECM of FIG. 1 in carrying out the diagnostic method of this invention.
Figure 4:
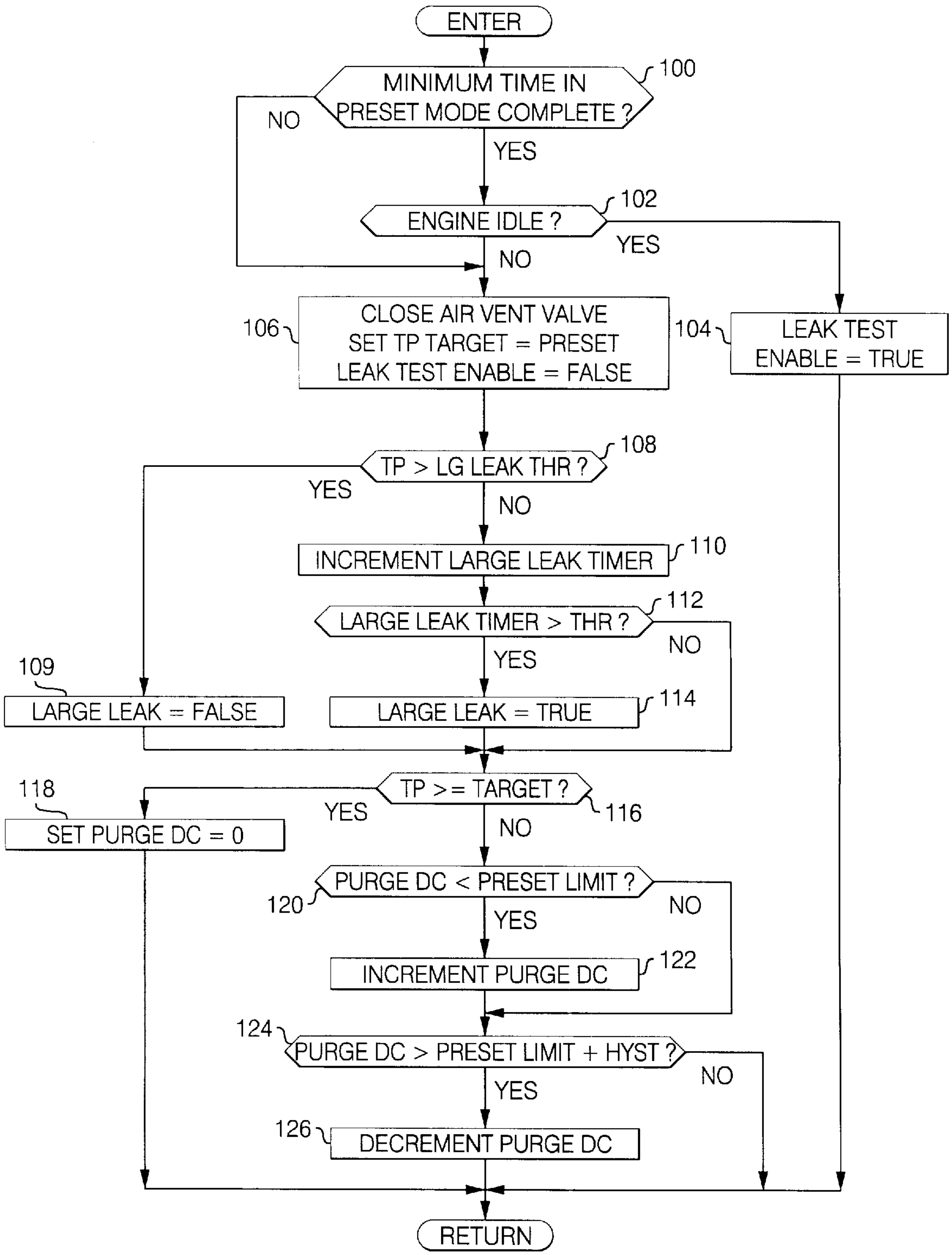

FIGS. 3 and 4 are flow diagrams representative of computer program instructions executed by the ECM 60 for carrying out the above-described diagnostic method. FIG. 3 describes a diagnostic routine that is executed during a diagnostic interval, and FIG. 4 details a portion of the flow diagram of FIG. 3 concerning the preset step.

Referring to FIG. 3, block 80 of the diagnostic routine is first executed to determine if the preset enable conditions have been met. This may involve, for example, determining if the engine coolant temperature is within a predefined range, if the difference between the coolant temperature and the inlet air temperature is within a given range, if the measured fuel level is within a given range, and if the barometric pressure is within a given range. If one or more of the conditions is not met, the block 82 is executed to disable the evaporative leak diagnostic. If all of the conditions are met, the block 84 is executed to run the preset routine, which is detailed in the flow diagram of FIG. 4. Block 86 then determines if the preset routine has enabled the leak test. If so, the blocks 88–92 are executed to run the leak test, to compare the determined SLOPE to a leak threshold THRleak, and to report the results of the test. In general, the leak test is considered to have been failed if the determined SLOPE exceeds the threshold THRleak. If the leak test is not enabled, the block 94 determines if the preset routine has been enabled for longer than a reference time, such as six minutes. If not, the blocks 80–92 are re-executed as described above. If the time out has been exceeded, the block 96 determines if the preset routine has detected a large leak, described below. If block 96 is answered in the affirmative, the block 92 is executed to report the detected large leak, ending the routine; otherwise, the diagnostic routine is concluded.

Referring to FIG. 4, the Preset routine first executes blocks 100 and 102 to determine if the Preset routine has been enabled for at least a predetermined interval (such as 15 seconds) and an engine idle condition has been achieved. If both conditions are met, the block 104 is executed to set LEAK TEST ENABLE=TRUE, ending the Preset routine. If one or both of the conditions defined by blocks 100 and 102 are not met, block 106 is executed to set LEAK TEST ENABLE=FALSE, to close the air vent valve 44, and to set the tank pressure target (TP TARGET) to PRESET.

The blocks 108–114 are then executed to detect the existence of a large system leak. If the tank vacuum is greater than a large leak threshold, as determined at block 108, a large leak is ruled out, and the block 109 is executed to set LARGE LEAK=FALSE. However, if the tank vacuum is less than the large leak threshold, the blocks 110 and 112 are executed to increment the large leak timer, and to determine if the timer has exceeded a threshold THR. If the timer exceeds the threshold, the block 114 is executed to set LARGE LEAK=TRUE. If desired, the magnitude of the timer increment can be adjusted to reflect the duty cycle of the purge valve so that the timer count is indicative of the vapor flow extracted from the system, thereby providing a more reliable indication of a leak. As indicated above in reference to FIG. 3, the large leak is reported if the leak test is not performed prior to the preset timeout; if the leak test is performed prior to the timeout, the leak will be identified by the determined SLOPE, and then reported based on the leak test.

The blocks 116–126 are then executed to determine the purge valve modulation duty cycle. If the TP is greater than or equal to the TP TARGET pressure, as determined at block 116, the block 118 is executed to set the purge valve duty cycle DC to zero, closing the valve 42. If the TP is lower than TP TARGET, the current duty cycle DC is compared to a limit value (PRESET LIMIT). If DC is below the limit, as determined at block 120, the block 122 is executed to increment DC; if DC is above the sum of the limit and a small hysteresis term (HYS), as determined at block 124, the block 126 is executed to decrement DC.

In the manner described above, the diagnostic method of the present invention provides an improved method of detecting the existence of a leak in an evaporative emission system at engine idle by preparing the system for the leak test prior to achieving the idle condition. The time required to conduct the leak test is improved because the system pressure is at or near the test pressure when the engine idle condition is achieved, and at the same time, the reliability of the leak test data is improved because vapor generation equilibrium in the fuel tank is more nearly achieved when the leak test is initiated.

While the present invention has been described in reference to the illustrated embodiment, it is expected that various modifications in addition to those discussed above will occur to those skilled in the art. For example, the PRESET pressure may be somewhat greater than or equal to the TEST pressure, and the minimum time in preset may be adjusted based on fuel temperature or soak time, and/or upon re-fueling. Also, the preset mode may be used in conjunction with a different evaporative system, such as a zero-evaporation or continuous-vacuum system, which is un-vented during engine off periods.

Thus, it will be understood that methods incorporating these and other modifications may fall within the scope of this invention, which is defined by the appended claims.

What is claimed is:

1. A method of diagnosing a leak in an automotive evaporative emission system during an engine idle condition of a driving cycle by measuring a system pressure, bringing the measured pressure to a reference value below atmospheric pressure, determining a rate of change of the measured pressure, and comparing the determined rate of change to a reference rate, the improvement wherein:

a preset mode of operation is initiated during the driving cycle but prior to achieving the engine idle condition, the preset mode of operation comprising the steps of:

bringing the measured pressure to a target value substantially equal to said reference value; and holding the measured pressure at said target value until said engine idle condition is achieved, and then initiating the leak diagnosing method.

2. The improvement of claim 1, wherein the preset mode of operation includes the steps of:

timing an interval during which the measured pressure has not reached a threshold pressure; and indicating the existence of a large leak in said system if said timed interval exceeds a reference time.

3. The improvement of claim 1, wherein the preset mode of operation includes the step of:

holding the measured pressure at said target value until the engine idle condition is achieved and said preset mode of operation has been in effect for at least a minimum time interval.

4. A method of diagnosing a leak in an automotive evaporative emission system during an engine idle condition of a driving cycle, including the steps of:

measuring a system pressure;

initiating a preset mode of operation during the driving cycle, but prior to achieving the engine idle condition, by bringing the measured pressure to a sub-atmospheric target value at or near a test pressure, and holding the measured pressure at said target value; and when the engine idle condition is achieved, conducting a leak test by bringing the measured pressure to said test pressure, closing the system, determining a rate of change of the measured pressure, and comparing the determined rate of change to a reference rate to diagnose a system leak.

5. The method of claim 4, including the step of:

terminating said preset mode of operation if a predetermined timeout interval elapses prior to achievement of said engine idle condition.

6. The method of claim 5, including the steps of:

periodically incrementing a timer during the preset mode of operation until the measured pressure reaches a threshold pressure; and indicating the existence of a large leak in said system upon termination of said preset mode of operation if a count of said timer exceeds a reference.

7. The method of claim 4, wherein the preset mode of operation includes the step of:

conducting the leak test when the engine idle condition has been achieved and said preset mode of operation has been in effect for at least a minimum time interval.

8. The method of claim 4, wherein said system includes a vent valve coupled to atmospheric pressure and a purge valve coupled to an engine air intake, and the step of initiating the preset mode of operation comprising the steps of:

closing the vent valve; and modulating the purge valve between open and closed states so as to regulate the measured pressure at said target value.

9. The method of claim 8, including the steps of:

periodically incrementing a timer during the preset mode of operation until the measured pressure reaches a threshold pressure;

adjusting an amount by which the timer is incremented in accordance with the modulation of said purge valve; and indicating the existence of a large leak in said system if a count of said timer exceeds a reference.

10. The method of claim 8 including the steps of:

increasing the modulation of said purge valve if the measured pressure is less than said target pressure and the modulation is less than a limit value; and decreasing the modulation of said purge valve if the measured pressure is less than said target pressure and the modulation is greater than said limit value.

* * * * *